United States Patent [19]
Golan et al.

[11] 3,804,191
[45] Apr. 16, 1974

[54] TRANSMISSION COORDINATING SYSTEM WITH ANTI-STALL MEANS FOR VEHICLES HAVING A PLURALITY OF ENGINES

[75] Inventors: Kenneth F. Golan, Pekin; Charles E. Holzinger, Peoria, both of Ill.

[73] Assignee: Caterpillar Tractor Co., Peoria, Ill.

[22] Filed: Dec. 4, 1972

[21] Appl. No.: 311,925

[52] U.S. Cl............... 180/49, 180/14 A, 180/77 R, 180/103, 74/847, 172/3, 192/.032, 303/21 A
[51] Int. Cl....................... B60k 17/34, B60k 19/16
[58] Field of Search.... 180/14 R, 14 A, 14 D, 77 R, 180/82 R, 70 R, 103, 49; 303/21 A; 74/864, 847, 861, 365; 192/.032; 172/3

[56] References Cited
UNITED STATES PATENTS

| | | | |
|---|---|---|---|
| 3,138,966 | 6/1964 | Kempf et al. .......................... | 74/365 |
| 3,061,030 | 10/1962 | Shallenberg........................ | 180/77 R |
| 3,584,698 | 6/1971 | Larson............................... | 180/14 A |
| 3,512,277 | 5/1970 | Stuller.............................. | 180/77 R |
| 3,550,478 | 12/1970 | Bechman et al. .................. | 180/77 R |
| 3,130,805 | 4/1964 | Carter et al....................... | 180/14 A |
| 3,064,371 | 11/1962 | Kutzler............................. | 180/77 R |
| 3,572,176 | 3/1971 | Bildat............................... | 74/334 |
| 3,679,018 | 7/1972 | Luft ................................. | 180/70 R |
| 3,360,064 | 12/1967 | Budzich et al..................... | 180/14 A |

Primary Examiner—David Schonberg
Assistant Examiner—John P. Silverstrim
Attorney, Agent, or Firm—Fryer, Tjensvold, Phillips & Lempio

[57] ABSTRACT

A first engine drives the front wheels of a vehicle through a master transmission and a second engine drives the rear wheels through a slave transmission and a remote control system normally maintains the slave transmission in the same drive ratio as the master transmission. Anti-stall means assumes control of the remote control system to downshift the slave transmission, preferably to a torque converter range, if vehicle speed drops below a predetermined value while the master transmission remains at an inappropriately high drive ratio as this condition is indicative of a loss of traction at the front wheels. Means are provided for holding the slave transmission in the down-shifted condition if vehicle speed fluctuates slightly about the value which activates the anti-stall means.

10 Claims, 3 Drawing Figures

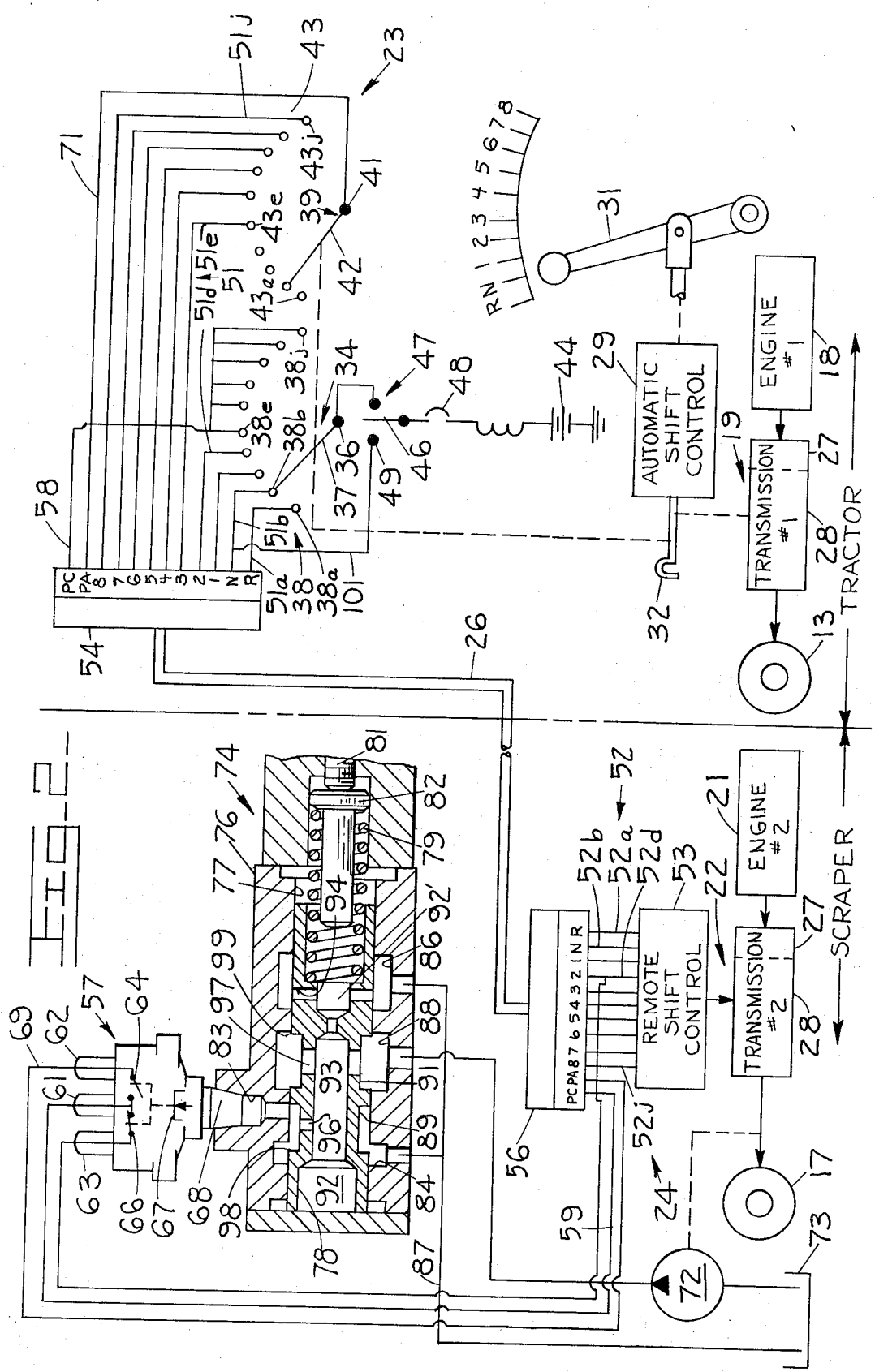

TRANSMISSION COORDINATING SYSTEM WITH ANTI-STALL MEANS FOR VEHICLES HAVING A PLURALITY OF ENGINES

BACKGROUND OF THE INVENTION

This invention relates to vehicle drive systems and more particularly to systems for coordinating the operation of separate transmissions in vehicles having more than one engine.

To provide increased traction and load carrying capacity, certain vehicles are provided with more than one engine in an arrangement where each engine drives a separate set of wheels, tracks or other ground engaging members through separate transmissions. Under most conditions, it is desirable that the drive ratios through two or more transmissions be the same at any given time. If drive ratios are dissimilar, a portion of the total engine power output is unused and wear of certain vehicle components is accelerated. Accordingly, means are generally provided for assuring synchronization of the transmissions in this respect. Typically, the drive ratio is manually or automatically selected at one transmission, which may be termed the master transmission, and remote control means are provided to force a corresponding shift of the other transmission or transmissions, which may be termed slave transmissions, whenever the master transmission is shifted.

There are special conditions under which it may not be desirable that the drive ratio of a slave transmission be similar to that of the master transmission. One such condition occurs if there is a loss of traction at the wheels or the like which are driven through the master transmission. Such a loss of traction can occur from passage of the vehicle over mud, snow, ice or other soft surfaces.

Slippage of the wheels or the like which are driven through the master transmission tends to place the full load of propelling the vehicle on the engine or engines which are coupled to the slave transmissions. Under this condition, a slave transmission should be rapidly downshifted. Such downshifting may avoid stalling of the engine coupled to the slave transmission or slippage of the wheels driven therethrough either of which is likely to result in stalling of the vehicle itself.

Very often the vehicle operator cannot manually accomplish such a downshift with sufficient speed to prevent stalling and if the master transmission is wholly or partly automatic it may actually react by forcing an upshift of the slave transmission since slippage of the wheels coupled to the master transmission creates an apparent decrease in loading which would normally call for an upshift. Such an upshift under these conditions aggravates the tendency to stall as discussed above.

SUMMARY OF THE INVENTION

This invention is a system for coordinating the drive ratios of a plurality of transmissions in a vehicle which has a plurality of engines each driving a separate set of ground engaging members through separate ones of the transmissions. In particular, the invention provides anti-stall means for automatically downshifting one or more slave transmissions independently of the master transmission if the ground speed of the vehicle drops below a predetermined value while the drive ratio at the master transmission is inappropriate to the low ground speed which condition is indicative of a loss of traction.

In a preferred form the invention includes further means for preventing repetitive downshifting and upshifting of the slave transmission if vehicle ground speed undergoes minor fluctuations about the value which initiates operation of the anti-stall means. The invention is applicable to transmissions in which shifting is initiated manually and also to fully automatic or self-shifting transmissions, but in a preferred form is utilized with a hybrid transmission in which lower speed ranges are selected manually while automatic means provide for shifting between upper speed ranges and in this particular context, further means are provided for inactivating the anti-stall means while the transmissions are within the manually selected speed ranges in order to enable the operator to select a still lower speed range than that initiated by the anti-stall means or to select reverse range.

Accordingly, it is an object of this invention to decrease the probability of stalling of a multi-engined vehicle while travelling over soft or slick surfaces.

The invention, together with further objects and advantages thereof, will best be understood by reference to the following description of a preferred embodiment taken in conjunction with the accompanying drawings.

BRIEF DESCRIPTION OF THE DRAWINGS

In the accompanying drawings:

FIG. 2 is a schematic diagram of the transmission coordinating system of the vehicle of FIG. 1.

DESCRIPTION OF A PREFERRED EMBODIMENT

Figure 1:
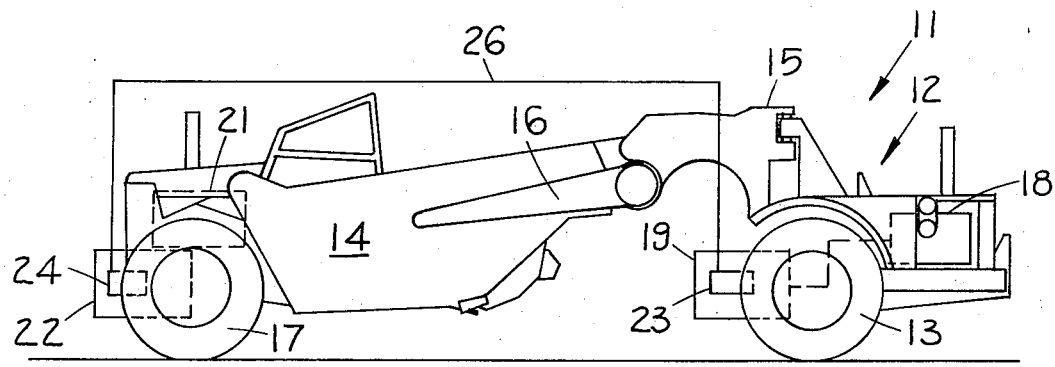
FIG. 1 is a side elevation view of a multiple engine vehicle having anti-stall means in accordance with the invention.

Referring initially to FIG. 1, the invention is shown applied to an earthmoving scraper 11 of the form having a tractor 12 riding on front wheels 13 and coupled to a scraper bowl 14 through an articulation 15 and draft arms 16 wherein the scraper bowl rides on rear wheels 17, the detailed construction of such a scraper being well known to the art. In order to provide maximum traction and load carrying capacity such a scraper 11 may have a front engine 18 driving the tractor wheels 14 through a first transmission 19, hereinafter termed the master transmission, which provides for a plurality of drive ranges while also having a rear engine 21 coupled to the rear wheel 17 through a second similar transmission 22, hereinafter referred to as the slave transmission. It should be understood that the invention is herein described as applied to a scraper 11 for purposes of example only, the system being equally applicable to other types of vehicles including vehicles which may employ tracks or other running gear as ground engaging members.

Under most operating conditions, efficient use of the power of both engines 18 and 21 to drive the vehicle requires that the two transmissions 19 and 22 be in the same drive range at a particular time and that a shift of one transmission be accompanied by a similar shift of the other transmission. For this purpose, a signal generating means 23 is coupled to the master transmission 19 to generate signals indicative of the drive range existing in the master transmission at any given time and such signals are transmitted to a remote control unit 24 coupled to the slave transmission 22 through a multiconductor cable 26 extending therebetween. For convenience of illustration, cable 26 is shown in FIG. 1 extending from signal generator 23 to remote control means 24 independently of the other vehicle structure, it being understood that in practice the cable is attached to the various portions of the vehicle that extend between the two transmissions.

Considering now the detailed circuit and structure of the transmission coordinating system, reference should be made to FIG. 2 wherein the engines, transmissions and wheels driven thereby are shown in schematic form. Both transmissions 19 and 22 in this example are of the particular form disclosed in U.S. Pat. No. 3,386,540 and reference should be made thereto for a detailed description. Such transmissions have a hydrodynamic or torque converter portion 27 and a portion 28 of the planetary form wherein eight forward drive ranges, a neutral range and one reverse drive range are provided wherein reverse and the first and second forward speed ranges utilize the torque converter portions 27 in whole or in part while the third to eighth forward speed ranges utilize only the planetary portion 28 of the transmission to provide wholly mechanical drive. The master transmission 19 is controlled by a shift control unit 29 of the form described in U.S. Pat. No. 3,452,621 and reference should be made thereto for a detailed description of such a device. A shift control unit 29 of this form responds to movement of an operator's control level 31 in such a way as to provide for strictly manual determination of the drive range of the master transmission 28 in the first forward drive range and in neutral and reverse while providing for an automatic or self-shifting action within forward drive ranges two to eight. Adjustment of the operator's control lever 31 to any drive range setting between third and eighth enables the shift control unit 29 to automatically shift transmission 19 between that particular drive range and any other lower drive range down to the second forward drive range in accordance with vehicle speed and load conditions. As described in detail in U.S. Pat. No. 3,452,621, shift control unit 29 has a control member 32 which moves to a distinctly different position for each particular drive range. Movement of this member 32 is used to control the signal generating means 23 of the present invention as will hereinafter be described.

Considering now a suitable circuit for the signal generating means 23, a first 10 position electrical switch 34 has an input terminal 36 connected to a wiper 37 which may be moved to connect the input with any of 10 output terminals 38a to 38j. A second ten position electrical switch 39 has an input terminal 41 connected with a wiper 42 which may be moved to connect the input 41 with any of ten additional output terminals 43a to 43j. The wipers 37 and 42 of switches 34 and 39 respectively are mechanically linked together and are jointly operated by movement of the member 32 of shift control unit 29 to be switched to a distinct individual one of the respective contacts 38 and 43 for each distinct drive range of master transmission 19. Thus, the reverse position of member 32, wiper 37 contacts output terminal 38a while wiper 42 contacts output terminal 43a and at neutral wiper 37 contacts output terminal 38b while wiper 42 contacts output termal 43b. Output terminals 38c to 38j are successively contacted by wiper 37 at successive ones of drive ranges one through eight while output terminals 43c to 43j are contacted by wiper 42 at successive ones of the drive ranges one to eight.

The signal generating means 23 is electrically energized from a suitable DC power supply 44 such as the vehicle battery which has one side grounded to the vehicle frame and the other side connected to the movable contact 46 of a three position manually operated control switch 47 through a protective circuit breaker 48. Manual control switch 47 has a Neutral position at which contact 46 connects with a first output terminal 49 for purposes to be hereinafter described and has a second or Run position at which contact 46 connects with input terminal 36 of switch 34 to energize the wiper 37 thereof.

Switch 34 provides the signals for initiating Reverse, Neutral, and the first and second forward drive range conditions in the slave transmission 22 when a similar drive range condition exists at the master transmission 19. For this purpose, individual conductors 51a to 51d are connected with corresponding input conductors 52a to 52d respectively of a remote control unit 53 which controls the drive range of the slave transmission 22, such connections being made through the multiconductor cable 26 which may have multi-pin connectors 54 and 56 at the front and back ends respectively to facilitate the necessary electrical connections.

Remote control unit 53 may be of the form described in U.S. Pat. No. 3,138,966 and reference should be made thereto for a detailed description. In such a remote control unit, the slave transmission 22 is shifted to a particular drive range by electrically energizing an individual one of the input conductors 52 which corresponds to that drive range. Accordingly, provided manual switch 46 is in the Run position, shifting of the master transmission 19 to any of the Reverse, Neutral or first and second forward drive range acts, through switch 34, cable 26 and remote control unit 53 to effect a similar shift of the slave transmission 22.

Signals for causing the remote control unit 53 to shift slave transmission 22 to any of the third through eighth forward drive ranges, when a similar shift occurs at the master transmission 19, are originated through the other switch 39 of signal generating means 23. For this purpose, output terminals 43d to 43j of switch 39 are connected to the input conductors 52e to 52j respectively of remote control unit 53 through separate ones of additional conductors 51e to 51j and the previously described pin connector 54, cable 26 and pin connector 56. The initial four output contacts 43a to 43d of switch 39 are unutilized and are present in this example only because it is most practical to employ a standard two deck ten position rotary switch to provide the functions of switches 34 and 39.

The wiper 42 of switch 39 does not receive electrical energization directly from the manual control switch 47 as in the case of switch 34. Instead switch 39 receives energization, only when master transmission 19 is in the third through eighth drive ranges, through the other switch 34 and through a remotely situated pressure switch 57 which detects vehicle ground speed as will hereinafter be described in more detail. To transmit energization to the pressure switch 57 when the master transmission 19 is at any of the third to eighth drive ranges, the remaining output terminals 38e to 38j of switch 34 are each connected to a common power conductor 58 which extends to the pressure switch through pin connector 54, cable 26, pin connector 56 and an additional conductor 59.

Pressure switch 57 may be of the known form having a common power terminal 61 to which conductor 59 connects and having a pair of output terminals 62 and 63. Pressure switch 57 further has a set of normally open contacts 64 connected between terminals 61 and 62 and a set of normally closed contacts 66 connected between terminals 61 and 63, and has flexible diaphragm means 67 which responds to fluid pressure at an inlet fitting 68 by closing the normally open contacts and opening the normally closed contacts. Thus if the inlet 68 is unpressurized, the common terminal 61 is connected to output terminal 63 while pressurization of the inlet breaks this connection and connects the common terminal to output terminal 62 to supply energization thereto. Under the pressurized condition a conductor 69 transmits energization from output terminal 61 to the input terminal 41 of signal generating means switch 39 through a conductor 69 to pin connector 56, cable 26, pin connector 54 and an additional conductor 71.

Accordingly, if the inlet 68 of pressure switch 57 is pressurized and switch 34 is at any of the third through eighth positions, then electrical energization is transmitted to switch 39 of the signal generating means. Under these conditions, switch 39 acts to transmit energization to the appropriate one of the remote control unit inputs 52e to 52j to place the slave transmission 22 in the same drive range as the master transmission.

The circuit, as described to this point, provides for matching of the drive range of slave transmission 22 with that of master transmission 19 at all times provided that the pressure switch 57 remains pressurized. As previously discussed, there is a specialized situation under which it is desirable that the drive range of the slave transmission 22 depart from that of the master transmission 19. Specifically, if the front wheels 14 should slip on a soft or slick surface while the operator's control lever 31 is at one of the third to eighth settings, at which master shift control 29 provides for automatic shifting, it is desirable that the slave transmission 22 be downshifted to a lower drive range. Preferably, transmission 22 should be shifted down to a range which includes the torque converter 27 of the slave transmission in the power path since severe loading may stall the associated engine 21 if a wholly mechanical drive path is present whereas this does not necessarily occur with fluid drive.

For this purpose, a decrease of vehicle speed below a predetermined value is detected and the slave transmission 22 is released from synchronism with the master transmission 19 if the master transmission is at an inappropriately high drive range for that vehicle speed as this indicates a loss of traction at the front wheels. The slave transmission is then shifted automatically into a low drive range which includes the torque converter 27 in the power path.

Vehicle gound speed is sensed in this example by a pump 72 drawing fluid from a reservoir 73 and driven by being coupled to the output of the slave transmission 22. As the output of the slave transmission 22 also drives the rear wheels 17, the output pressure of pump 72 is a function of vehicle speed. This pump output pressure operates pressure switch 57 when the vehicle speed reaches a predetermined value and depressurizes switch 57 when vehicle speed drops below this value to ready the anti-stall mechanism should it be needed. As previously pointed out, depressurization of switch 57 causes contacts 64 to open while causing contacts 66 to close and thereby supply electrical energization to terminal 63, if it is present at terminal 61. Terminal 63 is connected to the particular input signal conductor 52d of remote control unit 53 that initiates shifting of the slave transmission 22 into the second forward speed range.

Thus, in operation a decrease of vehicle speed readies the system for an automatic downshift of the slave transmission into the second forward drive range but this downshift occurs only if the master transmission is in a higher forward drive range at that time or should upshift to a higher drive range while the switch is unpressured. If the master transmission is already in second or first or neutral or reverse, then depressurization of switch 57 has no effect since signal generating means switch 34 is not supplying electrical energization thereto. But if the master transmission is in any of the third through eighth forward drive ranges, then electrical energization is present at switch 57 and depressurization thereof closes contacts 66 to send a signal to remote control unit 53 which downshifts the slave transmission. Simultaneously, contacts 64 open to remove energization from switch 39 and thereby prevent any other signal from being transmitted to the remote control unit 53.

While the output of pump 72 can be transmitted directly to inlet 68 of pressure switch 57, this can result in repeated intermittent operation or chattering of the switch 57 if the vehicle speed should fluctuate about the critical value and this could result in unnecessary repeated shifting of the slave transmission 22. To avoid such switch chattering, the output of pump 72 is applied to pressure switch inlet 68 through a snap action valve 74 which causes the switch to remain unpressurized until a vehicle speed is reached which is higher than the speed at which the switch is depressurized. In other words, the snap action valve 74 operates to introduce a degree of hysteresis into the operation of the pressure switch 57 to avoid repeated switch operation by minor speed fluctuations about the nominal switch operating value.

The snap action valve 74 may have a body 76 with a bore 77 therein in which a valve spool 78 is disposed for axial movement. A compression spring 79 within bore 77 acts to urge the spool 78 towards a first position wherein the spool abuts one end of the bore. A screw 81 is threaded into body 76 to bear against a member 82 which reacts against spring 79 whereby the screw may be used to adjust the force which the spring exerts against the spool 78. Pressure switch 57 is mounted on valve body 76 which has a passage 83 communicating the pressure inlet fitting 68 of switch 57 with bore 77.

A pair of spaced apart annular drain grooves 84 and 86 in the wall of bore 77 are communicated with a drain conduit 87 to fluid reservoir 73, the grooves being situated on opposite sides of passage 83. A fluid inlet groove 88 is also present in the wall of bore 77, between passage 83 and groove 86 and is communicated with the outlet of pump 72 to receive the fluid pressure which is indicative of engine speed.

Spool 78 has a first annular groove 89 positioned to communicate passage 83 with drain groove 84 when the spool is in the above described first position and has a second groove 91 which overlaps bore groove 88 when the spool is in all positions. Spool 78 furhter has an axial passage 92 forming a chamber extending from the end remote from spring 79 to a first constricted flow orifice 93 leading to a passage extension 92' situated in a portion of the spool adjacent bore groove 86 and communicated therewith through radial passages 94 in the spool. A second constricted flow orifice 96 communicates axial passage 92 with spool groove 89.

In the operation of valve 74, spring 79 urges spool 78 towards the first position at which inlet 68 of pressure switch 57 is effectively unpressurized since fluid entering groove 88 from pump 72 is transmitted to spool bore 92 through radial passages 97 therein and is returned to the reservoir 73 through flow orifices 96 and 93. At this position of the spool 78, the pressure switch inlet 68 is essentially communicated to drain past the spool edge 98 which defines one side of groove 89. As bore 92 is pressurized under this condition, owing to the flow constrictions 93 and 96 in the flow path through the valve, fluid pressure exerts a force on spool 78 tending to move the spool against the force of spring 79 and this fluid force is a function of the output pressure from pump 72 and is therefore proportional to vehicle speed. Accordingly, spool 78 shifts away from the first position as vehicle speed increases. When vehicle speed reaches a predetermined value, at which the possibility of stalling becomes remote, spool 78 has shifted to the point where edge 98 blocks pressure switch inlet 68 from drain. This speed may be selected by adjusting screw 81. With inlet 68 blocked from drain, fluid pressure is applied to pressure switch 57 to close contacts 64 and open contacts 66. This disables the anti-stall system and establishes the previously described electrical circuit conditions under which the drive range of slave transmission 22 is necessarily matched to that of master transmission 19.

Figure 3:
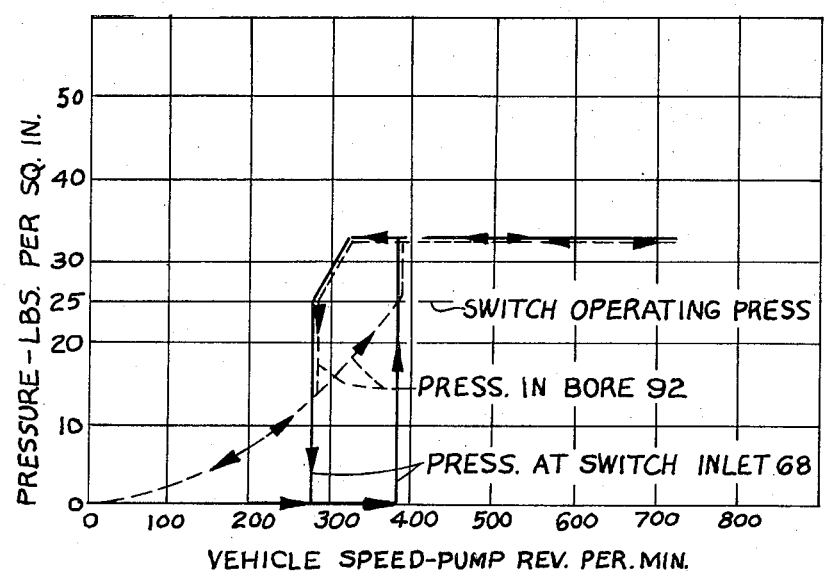
FIG. 3 is a graphical depiction of the response of a vehicle speed sensing valve means depicted in the system of FIG. 2.

Referring now to FIG. 3 in conjunction with FIG. 2, once land 98 has closed the drain passage through groove 84, the fluid pressure in spool bore 92 undergoes an abrupt increase causing the spool 78 to shift still further away from the first position in a rapid manner. This rapid movement is terminated when an edge 99 forming one side of spool groove 91 reaches drain groove 86 to establish a drain passage bypassing the flow orifice 93. Thereafter, valve 74 functions essentially as a relief valve maintaining the pressure applied to pressure switch 57 at the value at which edge 99 reaches drain groove 86 which pressure is above that needed to maintain the pressure switch 57 in the operated condition.

If vehicle speed subsequently drops below the predetermined value discussed above, indicating a need to ready the anti-stall action of the system for possible downshifting a slave transmission 22 independently of the master transmission, then the pressure within spool bore 92 drops accordingly enabling the spring 73 to move the spool towards the first position. When in the course of this movement edge 98 reaches drain groove 84, the pressure at the inlet 68 of pressure switch 67 is again relieved causing contacts 64 to open and contacts 66 to close so that automatic downshifting of slave transmission 22 may occur if conditions dictate as heretofore described. This return movement of the valve spool 78 causes land 98 to uncover drain groove 84 to relieve the pressure switch inlet 68 causing an abrupt drop in pressure in bore 92. As best seen in FIG. 3 this occurs at a lower vehicle speed than the speed at which the pressure switch was activated. The opening or closing of drain groove 84 by land 98 causes the hysteresis between switch activation and deactivation points. The size of orifice 96 determines the amount of hysteresis. This hysteresis in the operation of pressure switch 57 relative to vehicle speed avoids continual switch activation and deactivation if speed fluctuates in such a way that the output pressure of pump 72 has small fluctuations about the value needed to apply pressure to switch 57. In this example of the invention, the switch 57 is subjected to either no significant pressure or minimum of 25 lbs. per square inch as depicted in FIG. 3. Elimination of unwanted switch activation may be achieved by utilizing a switch which is activated at an intermediate value such as 12 lbs. per square inch in this example.

The manual control switch 47 which is operated to activate the transmission coordinating system was hereinbefore described as having an alternate position at which movable contact 46 connects with an output contact 49 rather than to the input of signal generating means switch 34. This alternate position, designated the neutral position, is utilized when the vehicle is being operated under conditions that do not require tractive power from the rear engine 21. This may occur, for example, when the scraper vehicle is unloaded and is being returned to a work site over a level, hard dry surface. Under this condition, it is desirable that the slave transmission 22 be placed in neutral independently of the master transmission. Accordingly, a conductor 101 connects terminal 49 with the single contact 38b of switch 34. This applies energization to the neutral input singal conductor 52b of the remote control unit 53 without regard to the speed range existing at the master transmission 19 when the manual control switch 47 is in the neutral position.

The electrical portions of the above described circuit, aside from the power supply 44, consist primarily of switches and conductors and thus the circuit can be constructed of fluid components rather than electrical components if analog forms of valve replace the switches and fluid pressure conduits replace the electrical conductors. Conversely the fluid circuit portions of this example may be replaced with electrical equivalents. Thus, if pressure switch 57 is converted to an electronically operated switch, then pump 72 may be an electrical generator producing a voltage proportional to engine speed and snap action valve 74 may be replaced with a Schmidt trigger circuit. Accordingly, reference to circuit means in the appended claims should be understood to refer to any of electrical, fluid or fluidic means unless otherwise qualified.

While the invention has been described with respect to a particular embodiment for purposes of example, it will be apparent that modifications are possible and it is not intended to limit the invention except as defined in the following claims.

WHAT IS CLAIMED IS:

1. In a vehicle having a first engine driving a first ground engaging member through a master transmission and a second engine driving a second ground engaging member through a slave transmission wherein each of said transmissions may be shifted to provide a plurality of drive ranges, a system for coordinating said transmissions comprising:

signal generating means linked to said master transmission for producing signals indicative of the drive range existing in said master transmission, a remote control unit coupled to said slave transmission and having means for shifting said slave transmission in response to said signals from said signal generating means to maintain said slave transmission at a drive range corresponding to that of said master transmission, and anti-stall means for downshifting said slave transmission to a predetermined drive range when the ground speed of said vehicle is below a predetermined value and the signal received from said signal generating means indicates a drive range higher than said predetermined drive range.

2. The combination of claim 1 wherein said slave transmission includes means providing a hydrodynamic power path in at least one drive range and providing a wholly mechanical power path at higher drive ranges wherein said predetermined drive range is said one which has a hydrodynamic power path.

3. The combination of claim 1 wherein said anti-stall means comprises switch means having a first state at which said signals from said signal generating means are transmitted to said remote control unit and having a second state at which said transmitting of said signals thereto is stopped and a signal indicative of said predetermined drive range is transmitted thereto, and ground speed sensing means for switching said switch means to said second state when ground speed decreases below said predetermined value while said signal generating means is producing a signal indicative of a higher speed range than said predetermined speed range.

4. The combination of claim 3 further comprising means for switching said switch means from said second state to said first state in response to an increase of ground speed to a value which is greater than said predetermined value which switches said switch means from said first state to said second state in response to decreasing ground speed.

5. The combination defined in claim 3 wherein said ground speed sensing device is a fluid pump driven through said slave transmission and wherein said switch means is a fluid pressure operated switch responsive to output pressure from said pump.

6. The combination defined in claim 5 further comprising a valve connected between said pump and said pressure operated switch and having means for responding to a rise of output pressure from said pump to a predetermined value by abruptly applying a still greater pressure to said switch and having means for abruptly decreasing the pressure applied to said switch when said applied pressure drops to said predetermined value whereby said pressure switch is switched from said second state to said first state in response to an increase of ground speed to a particular value and is restored to said second state in response to a decrease of ground speed to a lesser value.

7. The combination defined in claim 6 wherein said valve comprises a valve body having a bore therein and having an inlet communicating with said bore for receiving said output pressure of said pump and having an outlet communicated with said pressne switch and having a drain passage means, a valve spool slidable within said bore and having a fluid chamber within said spool and a passage for communicating said valve body inlet with said fluid chamber and having a first flow orifice communicating said fluid chamber with said pressure switch inlet and having a second flow orifice communicating said chamber with said drain passage and having a first edge which vents said pressure switch inlet to said drain passage means at a first position of said valve and which blocks said pressure switch inlet from said drain passage means when said spool is shifted away from said first position thereof by a predetermined amount and having a second edge which vents said fluid chamber to said drain passage when said spool is shifted away from said first position by a still greater amount, and resilient means exerting a force on said spool in a direction urging said spool towards said first position thereof.

8. The combination of claim 1 wherein said master transmission has means for manually establishing a selected one of a plurality of lower drive ranges therein and has self controlled shifting means for establishing any of a plurality of higher drive ranges therein, further comprising mens for inactivating said anti-stall means in response to manual shifting of said master transmission into one of said lower drive ranges.

9. The combination of claim 8 wherein the drive range of said master transmission is established by a shift control means having an element which moves to a distinct position for each drive range in said master transmission, and wherein said remote control unit has a plurality of signal input means which may be individually energized to establish specific drive ranges in said slave transmission, said signal generating means comprising:

a first switch having means for connecting a first input terminal to a different one of a first plurality of output terminals in response to shifting of said element of said shift control means to different ones of said positions thereof that correspond to different ones of said plurality of lower drive ranges, A second switch having means for connecting a second input terminal to a different one of a second plurality of output terminals in response to shifting of said element of said shift control means to different ones of said positions thereof that correspond to different ones of said plurality of higher drive ranges, conductor means connecting individual of said first and second pluralities of output terminals with corresponding individual ones of said signal input means of said remote control unit, means energizing said input terminal of said first switch, and means for energizing said input terminal of said second switch only when said element of said shift control is at a position corresponding to one of said higher drive ranges and said ground speed of said vehicle is above said predetermined value.

10. The combination of claim 9 wherein said anti-stall means comprises a third switch having a common terminal receiving energization through said first switch only when said element of said shift control means is at a position corresponding to one of said higher drive ranges and having a first output terminal connected to said input terminal of said second switch and having a second output terminal connected to a predetermined one of said signal input means of said remote control unit, said third switch having an unactuated condition at which said common terminal is connected to said second output terminal and is disconnected from said first output terminal and having an actuated position at which said common terminal is disconnected from said second output terminal and is connected to said first output terminal, and means for actuating said third switch when said ground speed of said vehicle exceeds a predetermined amount.

* * * * *